May 3, 1938.   K. BAUMANN   2,116,424
DEVICE FOR CONTROLLING TEMPERATURES IN FLUID HEATING APPARATUS
Filed Feb. 1, 1935   4 Sheets-Sheet 1

Inventor:
Karl Baumann,
by Harry E. Dunham
His Attorney.

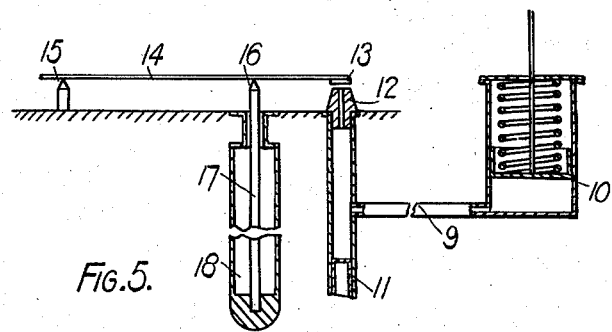
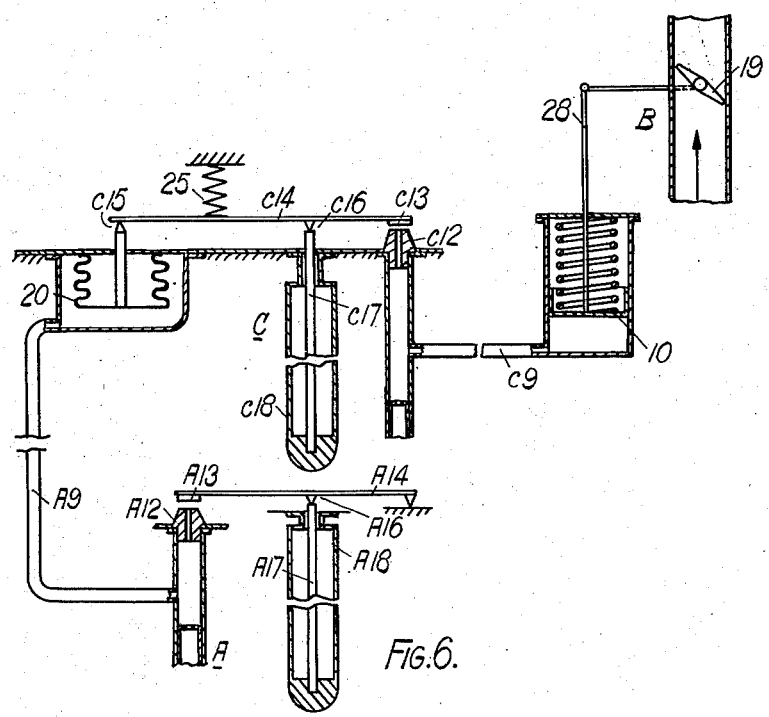

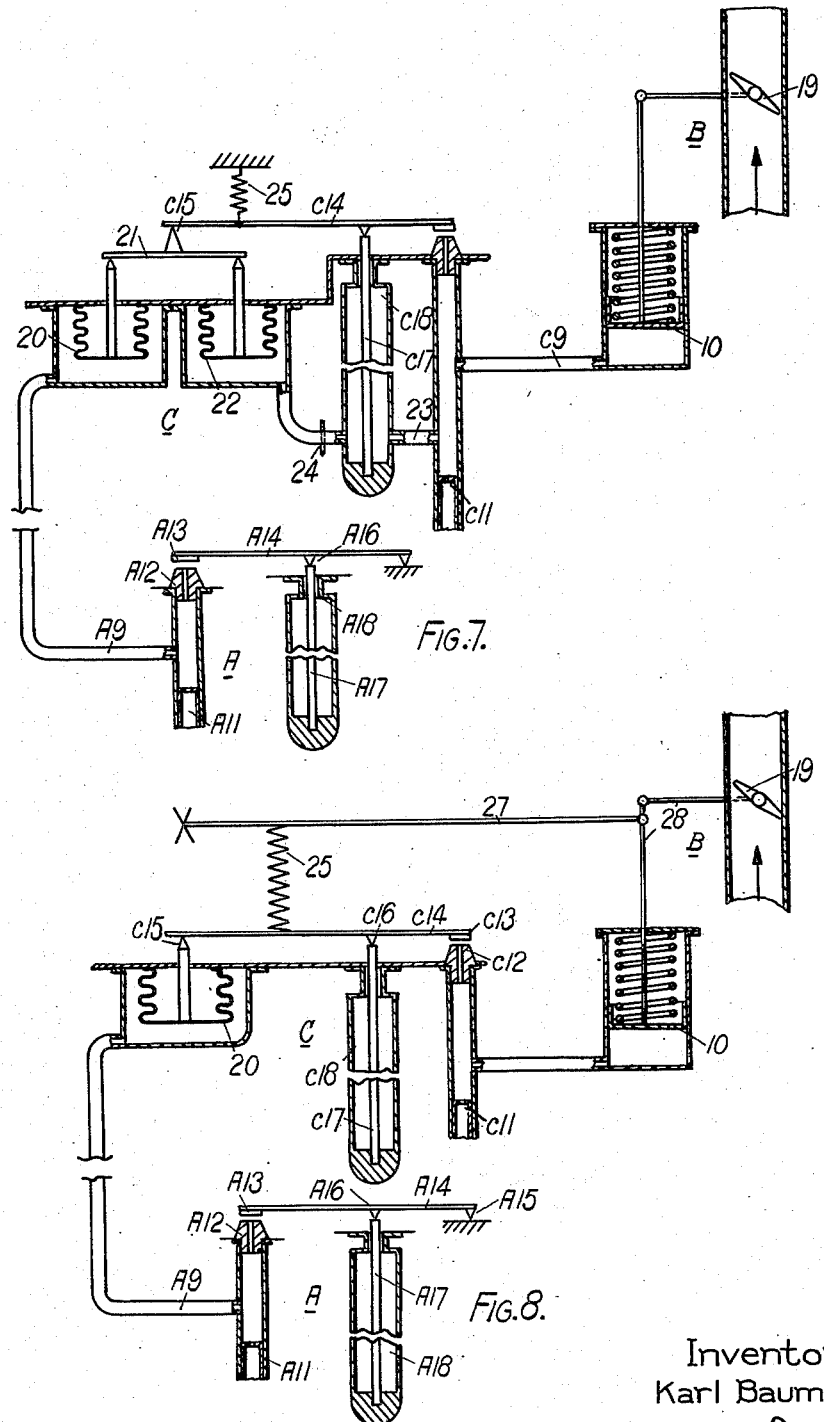

Inventor:
Karl Baumann,
by Harry E. Dunham
His Attorney.

Patented May 3, 1938

2,116,424

UNITED STATES PATENT OFFICE 2,116,424

DEVICE FOR CONTROLLING TEMPERATURES IN FLUID HEATING APPARATUS

Karl Baumann, Wilmslow, England, assignor to General Electric Company, a corporation of New York Application February 1, 1935, Serial No. 4,493
In Great Britain February 10, 1934

4 Claims. (Cl. 236—20)

This invention relates to fluid heating plant and has for its object to provide improved means for automatically controlling the action of the plant so as to maintain an operation factor such as temperature at a predetermined level independently of the load or other imposed external conditions. The invention has particular reference to plant in which the point in the fluid path at which the control action can be conveniently exerted is somewhat remote from the point at which the conditions are to be regulated and in which the intervening plant has an appreciable heat capacity. For example, in the case of a steam generating plant in which it is desired to maintain the temperature at the outlet constant the temperature may be controlled in various ways for instance by controlling the admission of the heating medium or by cooling the heated fluid by injecting a cold fluid or by cooling the heated fluid by heat exchange with a cold fluid taking place in a heat exchanger. In all such cases the actual point in the fluid circuit at which the control means must be located is somewhat remote from the outlet and consequently a certain time is necessary for the fluid to travel from the controlling means to the outlet. In addition the heating elements through which the fluid has to pass on its way to the outlet may have a considerable heat storage capacity some of which may be due to other parts of the installation.

As a result the temperature at the outlet will not immediately respond to the action of the control and there may be considerable delay between the moment when the controlling impulses from the temperature responsive means at the outlet is originated and the moment when as a result of the action of the control means the temperature at the outlet has been brought back to the required value. During the whole time until the temperature has been brought back to the required value controlling impulses of the original kind will continue to be transmitted to the control means from the temperature responsive means at the outlet with the result that the temperature change at the outlet will continue in the same direction after it has reached the required value until the effect of the opposite kind of impulses, which will begin to be transmitted from the outlet at the moment when the temperature starts to differ from the required value in the opposite sense is felt. From this moment the steam temperature at the outlet will begin to change in the reverse direction but owing to the inherent storage capacity of the system it will, as already explained, continue to change after it has reached the required value.

Any change in the temperature at the outlet may therefore cause protracted hunting of the controlling apparatus.

According to the present invention therefore in order to reduce or eliminate such hunting in a fluid heating plant wherein the temperature of the fluid at a determined point in the circuit is regulated by exerting a controlling action at another point in the fluid circuit relatively remote from the first point the control action is regulated in accordance with the state of the fluid at a third point in the circuit which responds more quickly to a change in the control action than said first point and such regulation is modified in accordance with the temperature at the first point. In applying the invention for instance to the control of the outlet temperature of a steam generating plant by means of a control action having effect at a point which is located earlier in the fluid circuit that is nearer to the inlet the control action will be regulated in accordance with the state of the steam at an intermediate point in the fluid circuit relatively near to the point at which the control action is exerted and such regulation of the control action will be modified in accordance with the temperature of the steam at the outlet.

In carrying out the invention fluid jet regulators may conveniently be employed. A fluid jet regulator comprises essentially a liquid containing system supplied with liquid under a substantially constant head and provided with a nozzle through which the liquid is extruded in a jet. A pad mounted on a pivoted arm acts as a target for the jet of liquid and the arm is positioned about its pivot by a temperature (or pressure) responsive device so that the distance of the pad from the nozzle is varied in accordance with the temperature (or pressure). The positioning of the pad in turn controls the pressure in the fluid system in the neighbourhood of the nozzle and thus regulates control organs actuated by the pressure of the liquid. An example of a fluid jet regulator is that known as the Arca regulator.

In order that the invention may be more clearly understod reference will now be made to the accompanying drawings which illustrate diagrammatically ways of applying the invention to the regulation of the temperature of a steam generating plant.

Fig. 5 shows the arrangement of a temperature responsive fluid jet regulator.

Figs. 6 to 10 show lay-outs of various forms of control apparatus embodying fluid jet regulators.

Referring first of all to Figs. 1 to 4, A is the first point, i. e. that at which it is desired to regulate the temperature, and B is the point at which the actual control action is exerted. Since in systems to which the invention is applicable the points A and B are relatively far apart the control action at B is regulated by temperature responsive means located at a third point C where the change in the condition of the fluid responds more rapidly to a change in the control action and this regulation is in turn modified by temperature responsive means located at the point A.

It has been explained above that if the control organs at the point B were regulated directly by temperature responsive means located at the point A there would be a liability to hunting owing to the time taken by the fluid in passing from the point in the fluid circuit at which the control action at B has effect to the point A also on account of the heat storage capacity of the intervening path. Regulation of the control action in accordance with the temperature at the point C may be arranged to eliminate the hunting but it is necessary to modify the regulating effect in accordance with the temperature at the point A since it is the temperature at this point which it is desired to control.

In many cases there will be an approximately predeterminable relationship between the temperature at the point C and the temperature at the point A. This relationship will depend upon various factors and principally upon the load and the position of the control organs and this relationship may be utilized in effecting the control.

Figure 1:
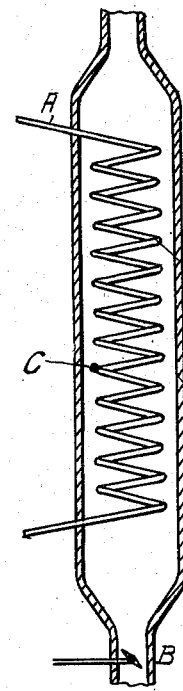
Figures 1 to 4 show the relative positioning of the control components as applied respectively to different methods of temperature control.

According to the arrangement shown in Fig. 1 the fluid path is indicated by the reference 1, while 2 indicates the flue passage or heating chamber in which the fluid system is heated. The point A is shown at the outlet of the fluid path and the control organs at the point B control the heating medium. As shown they consist of a damper controlling the flow of hot gases to the fluid system. Alternatively in cases where gas or oil burners are employed they might comprise a control acting on the burner or on the gas or oil supply. It will be appreciated that whilst the system of control organs at B will affect the whole of the fluid system the latter will respond more quickly at earlier points in its path than at later points. This is in part due to the fact that points lying earlier in the fluid path also lie earlier in the path of the hot gases. Thus the control C is selected at a position located appreciably earlier in the fluid path than is the point A.

Figure 2:
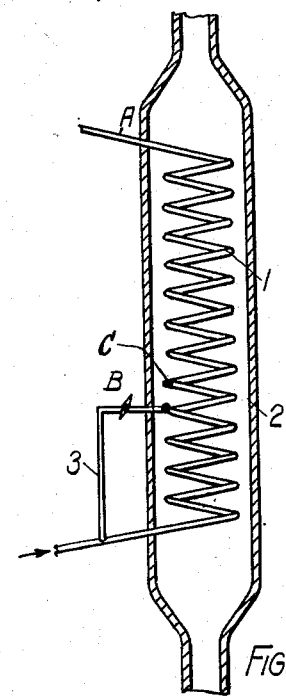

Fig. 2 shows an arrangement in which a bypass 3 is provided around the earlier path of the fluid circuit and control organs B comprise a cock controlling the bypass. Here the main point at which the control has effect is that at which the bypass rejoins the main fluid path and hence the point C is located relatively soon after this point.

Figure 3:
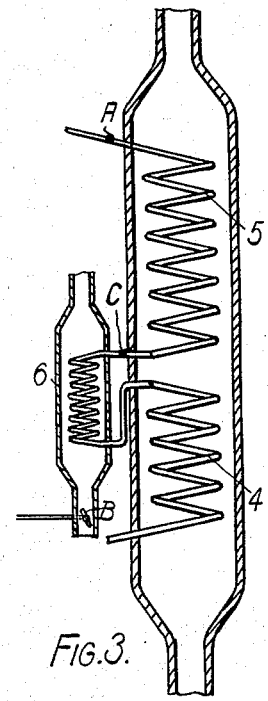

Fig. 3 shows an arrangement in which the fluid path consists for instance of superheaters 4 and 5 and the fluid path between these superheaters comprises a desuperheater 6 the action of which is controlled for instance as shown by throttling the steam outlet. The throttle will hence constitute the control organs B and its effect will be felt in the portion of fluid path located in the desuperheater 6. Here again the point C is preferably located between the outlet from the desuperheater and the superheater 5.

Figure 4:
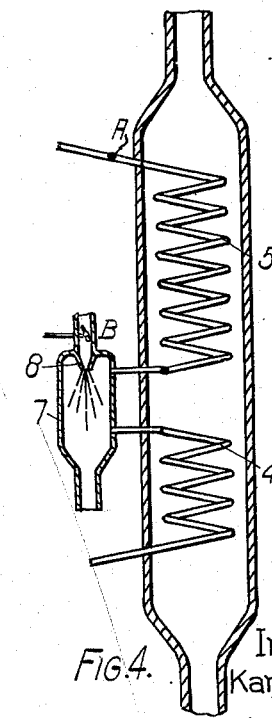

Fig. 4 shows an arrangement similar to that shown in Fig. 3 but in which the steam passing between superheaters 4 and 5 passes through a chamber 7 into which cold water is sprayed from a nozzle 8. Here the control B may as shown comprise a cock controlling the flow to the nozzle.

Fig. 5 illustrates diagrammatically the mode of operation of a fluid jet regulator of the well known Arca type which is adapted for temperature regulation. The device essentially relies upon the action of a liquid, which is usually water, under pressure, in a conduit system 9 upon a piston or diaphragm 10 of a hydraulic motor connected to actuate control means. A conduit system as shown at 1 in Fig. 1 is supplied with liquid under a constant head from a nozzle 11 and is in turn provided with a nozzle 12 from which the liquid emerges in the form of a jet and is projected against a pad 13. The pad 13 is carried on a rocker arm 14 which is fulcrumed at 15 and which, at the point 16 is acted upon by a rod 17 connected at its further end with a tube 18 of material possessing a relatively high co-efficiency of expansion. This tube will constitute the temperature means and will be located at the point in the fluid circuit from which it is desired that the controlling impulse should originate. Thus a rise in temperature will cause the tube 18 to expand; this will lower the rod 17 and hence the point of support 16 of the arm 14 and in so doing will move the pad 13 nearer to the nozzle 12. The pad will exert an increased reaction to the jet and hence raise the pressure in the conduit system 9 which increased pressure will by acting on the piston or diaphragm 10 cause a regulating impulse to be transmitted to the controlling apparatus. Conversely a fall in temperature will cause the support 16 to rise and move the pad 13 away from the nozzle 12 and so lower the pressure in the conduit system 9.

Obviously the relative positions of the pivot point 15 and the point 16 at which the temperature responsive device acts are interchangeable provided the apparatus is so arranged that the correct control action is obtained.

Since the water is supplied to the conduit systems from a source of constant head it follows that the pressure in the conduit system is a definite function of the distance of the pad from the nozzle.

Fig. 6 shows a layout of a simple form of control apparatus embodying the invention in which two such regulators C and A are employed, the piston or diaphragm 10C of regulator C being connected to control organs 19 indicated as a throttle acting on the fluid circuit, it being intended that the control organs 19 should be located at the point B referred to in Figs. 1–4 and that the thermostats C and A should similarly be located at points in the fluid circuit corresponding to C and A (in Fig. 1) respectively. The conduit system A9 of the regulator A is connected to actuate bellows 20 operating on the pivot point C15 of regulator C. In this figure the parts of the regulators are referred to by the same references that are employed in Fig. 2 but prefixed by the letter A or C as the case may be. Thus the temperature responsive device C18 will exert a primary regulation on the control means by raising or lowering the pad C13 in the manner above described while this action will be modified by the action of the temperature responsive device A18 in raising or lowering the pivot point C15.

Fig. 7 shows a modification of the arrangement shown in Fig. 6 in which the primary control action exerted by the regulator C is modified in the first place in accordance with the operating position of the control organs 19. This is effected by placing the pivot point C15 on a beam 21 one end of which is supported by a bellows 20 the pressure acting on which is controlled by the thermostat A18 as in the Fig. 6 arrangement, while the other end of the beam 21 is supported by a bellows 22 the pressure acting on which is that existing in the conduit system C9. This is obtained by means of a connection 23 between the conduit system C9 and the bellows 22 the connection 23 containing an orifice or restriction 24 which restricts the rate of movement of fluid from the conduit C9 to the bellows 22. The control action exerted by the regulator C is then further modified by the control device A if the temperature at A has not been maintained constant by the two earlier control actions.

Figure 9:
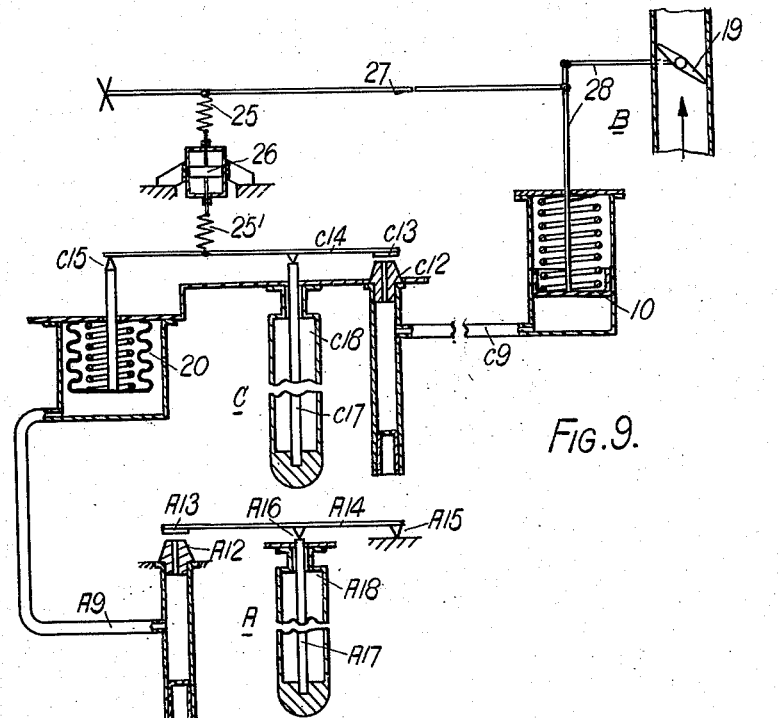

Fig. 8 shows an alternative arrangement to that shown in Fig. 7, in which a connection, which may be made through a relay or may be a direct mechanical connection, as shown in the figure, is made between the control organs 19 and the beam C14 of the regulator C through a spring 25, the movement of the control organs 19 varies the compression of the spring 25 and hence the resistance to movement offered to the arm C14 with the result that piston 10 will move further than it would have moved if the upper support of the spring had been fixed. Again the final modification of the control will be obtained by means of the control devices A. In view of the over-regulation obtained by varying compression of the spring 25 this method of control is liable to become unstable and to overcome this instability various stabilizing means may be introduced, one of which is shown in Fig. 9, where a dashpot 26 and a further spring $25^1$ is interposed between the spring 25 and the control lever C14. In this arrangement spring $25^1$ supplies a stabilizing force for rapid movements of piston 10 and the desired over-regulation will be obtained more slowly by spring 25 and dashpot 26.

Figure 10:
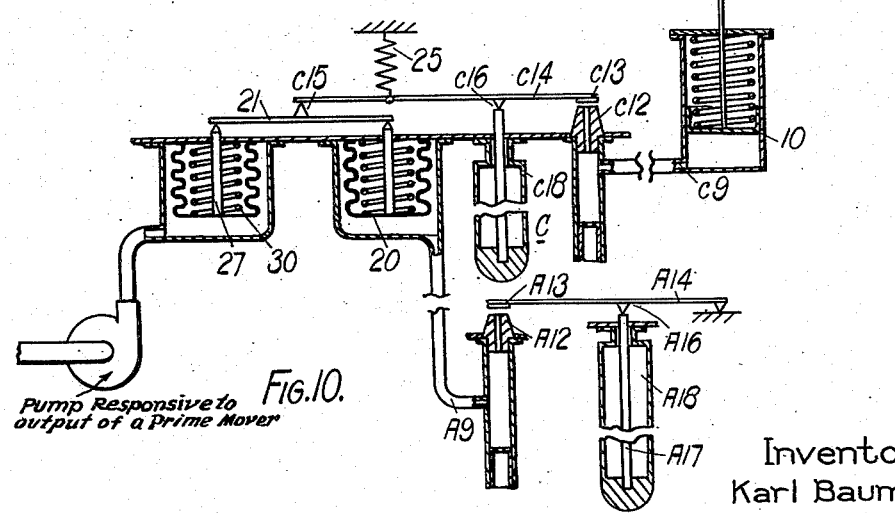

Fig. 10 shows a further arrangement in which the primary control is obtained by means of a device responsive to the amount of fluid passing through the system or to the load in the system. In the case of a steam power plant this may for instance, be the output from the prime mover. If a change in the load takes place an immediate adjustment of the control lever will take place by means of the action of the bellows 27 operating against a spring 30, the position of which is therefore dependent on the load. The secondary adjustment of the control will in this case be obtained by means of the thermostat C and the final modification by means of the control organs A.

The temperature or pressure at the point A, to maintain which the control action is made, need not be an absolute temperature but may for instance be the temperature difference between two points in the fluid circuit in which case the thermostat A might act differentially.

While in the descriptions given the controls are operated by means of bellows controlled by nozzles in accordance with designs used by Arca, other well known devices may be used, such as electrical contacts and motors. Further additional power operated devices may be introduced to obtain more positive operation. Stabilizing means such as are shown in Fig. 9 item 26 may also be introduced in any of the arrangements shown. Also instead of continuous operation, intermittent operation may be employed by well-known means providing impulses of constant or varying magnitude and at regular or varying intervals, the magnitude and/or the intervals being dependent on the departure of the actual temperatures from the desired temperatures and if desired also on the rate of change of temperatures.

I claim:—

1. In a fluid heating plant, the combination of a fluid circuit including a coil through which fluid to be heated is conducted during operation, means including a valve for controlling the heating of the fluid, a hydraulic motor for moving the valve, a conduit having a discharge nozzle for conducting operating fluid under pressure to the hydraulic motor, and means co-operatively associated with the nozzle for controlling the fluid pressure in the motor, said means comprising a lever, a pad secured to the lever adjacent the nozzle, a device responsive to the temperature in the outlet of said heating coil, a pressure responsive element controlled by said temperature responsive device and forming a movable fulcrum for the lever, and another device responsive to the temperature at a point intermediate the inlet and the outlet of the coil and forming another movable fulcrum for the lever to modify the action of the first temperature responsive device.

2. In a fluid heating plant, the combination of a fluid circuit including a coil through which fluid to be heated is conducted during operation, means including a valve for controlling the heating of the fluid, a hydraulic motor for moving the valve, a conduit having a discharge nozzle for conducting operating fluid under pressure to the hydraulic motor, and means co-operatively associated with the nozzle for controlling the fluid pressure in the motor, said means comprising a first lever, a pad secured to the first lever adjacent the nozzle, a device responsive to the temperature in the outlet of the heating coil, a pressure responsive element controlled by the temperature responsive device, another pressure responsive device subject to the pressure in the motor, a second lever connected to both pressure responsive elements and forming a movable fulcrum for the first lever, another temperature responsive device subject to the fluid temperature at a point intermediate the inlet and the outlet of the heating coil and forming another movable fulcrum for the first lever to modify the action of both pressure responsive devices.

3. In a fluid heating plant, the combination of a fluid circuit including a coil through which fluid to be heated is conducted during operation, means including a valve for controlling the heating of the fluid, a hydraulic motor for moving the valve, a conduit having a discharge nozzle for conducting operating fluid under pressure to the hydraulic motor, means co-operatively associated with the nozzle for controlling the fluid pressure in the motor, said means comprising a lever, a pad secured to the lever adjacent the nozzle, a device responsive to the temperature in the outlet of said heating coil, a pressure responsive element controlled by said temperature responsive device and forming a movable fulcrum for the lever, and another device responsive to the temperature at a point intermediate the inlet and the outlet of the coil and forming another movable fulcrum for the lever to modify the action of the first temperature responsive device, and means connected to the first lever for modifying the action of both temperature responsive devices in response to movement of the motor.

4. In a fluid heating plant, the combination of a fluid circuit including a coil through which fluid to be heated is conducted during operation, means including a valve for controlling the heating of the fluid, a hydraulic motor for moving the valve, a conduit having a discharge nozzle for conducting operating fluid under pressure to the hydraulic motor, means co-operatively associated with the nozzle for controlling the fluid pressure in the motor, said means comprising a lever, a pad secured to the lever adjacent the nozzle, a device responsive to the temperature in the outlet of said heating coil, a pressure responsive element controlled by said temperature responsive device and forming a movable fulcrum for the lever, and another device responsive to the temperature at a point intermediate the inlet and the outlet of the coil and forming another movable fulcrum for the lever to modify the action of the first temperature responsive device, and means connected to the first lever for modifying the action of both temperature responsive devices in response to movement of the motor, said last named means comprising a dashpot yieldingly connected between the first lever and the motor.

KARL BAUMANN.